United States Patent
Guild

(10) Patent No.: US 9,123,052 B2
(45) Date of Patent: Sep. 1, 2015

(54) MARKETING MODEL DETERMINATION SYSTEM

(75) Inventor: John A. Guild, Edgewater, NJ (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 364 days.

(21) Appl. No.: 12/830,608

(22) Filed: Jul. 6, 2010

(65) Prior Publication Data
US 2011/0010226 A1   Jan. 13, 2011

Related U.S. Application Data

(60) Provisional application No. 61/224,258, filed on Jul. 9, 2009, provisional application No. 61/238,335, filed on Aug. 31, 2009.

(51) Int. Cl.
*G06Q 30/02* (2012.01)
*G06Q 10/04* (2012.01)

(52) U.S. Cl.
CPC ............ *G06Q 30/02* (2013.01); *G06Q 30/0202* (2013.01)

(58) Field of Classification Search
CPC .............. G06Q 30/02; G06Q 30/0201; G06Q 30/0202; G06Q 10/0637
USPC ....................................... 705/7.29–34; 703/2
See application file for complete search history.

(56) References Cited

U.S. PATENT DOCUMENTS

| | | | |
|---|---|---|---|
| 5,406,477 A * | 4/1995 | Harhen | 703/6 |
| 5,918,232 A | 6/1999 | Pouschine et al. | |
| 6,009,407 A * | 12/1999 | Garg | 705/7.25 |
| 6,697,808 B1 | 2/2004 | Hurwood et al. | |

(Continued)

FOREIGN PATENT DOCUMENTS

| | | |
|---|---|---|
| JP | 10-049544 A | 2/1998 |
| JP | 2000-020504 A | 1/2000 |

(Continued)

OTHER PUBLICATIONS

Guoliang, Zhou et al., "What-if Analysis in Molap Environments", Fuzzy Systems and Knowledge Discovery, 2009, FSKD '09, Sixth International Conference on, IEEE, Piscataway, NJ, USA, [Online], Aug. 14, 2009, pp. 405-409, XP031584609.

(Continued)

*Primary Examiner* — Tiphany Dickerson
(74) *Attorney, Agent, or Firm* — Mannava & Kang, P.C.

(57) ABSTRACT

A system includes a variable determination module determining a variable operable to be used for the final model and also determining a modification to the at least one variable. An assumption determination module determines an assumption operable to be used for the final model. The assumption includes a transformation for the variable describing how the variable impacts the marketing objective or how the variable impacts another variable operable to be used in the final model. The assumption module also determines a modification to the assumption. A model generator generates a candidate model using the variable and the assumption, and generates a new candidate model using the modified assumption, the new variable or the modification to the variable. The candidate model or the new candidate model is operable to be selected as the final model based on at least one of a statistical measure and an indication of relevance for the variable in the candidate model and the new candidate model.

12 Claims, 8 Drawing Sheets

(56) References Cited

U.S. PATENT DOCUMENTS

| | | | |
|---|---|---|---|
| 7,526,434 B2* | 4/2009 | Sharp | 705/7.29 |
| 7,634,423 B2* | 12/2009 | Brocklebank | 705/7.29 |
| 7,725,300 B2* | 5/2010 | Pinto et al. | 703/2 |
| 7,895,191 B2 | 2/2011 | Colossi et al. | |
| 2002/0127529 A1* | 9/2002 | Cassuto et al. | 434/335 |
| 2003/0074358 A1 | 4/2003 | Sarbaz et al. | |
| 2004/0031058 A1 | 2/2004 | Reisman | |
| 2004/0093296 A1 | 5/2004 | Phelan et al. | |
| 2004/0215626 A1* | 10/2004 | Colossi et al. | 707/100 |
| 2004/0230470 A1 | 11/2004 | Svilar et al. | |
| 2005/0234760 A1 | 10/2005 | Pinto et al. | |
| 2005/0289561 A1* | 12/2005 | Torres et al. | 719/328 |
| 2006/0241923 A1 | 10/2006 | Xu et al. | |
| 2006/0271568 A1 | 11/2006 | Balkir et al. | |
| 2007/0106550 A1 | 5/2007 | Umblijs et al. | |
| 2008/0065470 A1 | 3/2008 | Nelmes et al. | |
| 2008/0154693 A1 | 6/2008 | Bateni et al. | |
| 2008/0195649 A1 | 8/2008 | Lefebvre | |
| 2009/0030864 A1 | 1/2009 | Pednault et al. | |
| 2009/0089254 A1 | 4/2009 | Von Kaenel et al. | |
| 2009/0234710 A1 | 9/2009 | Belgaied Hassine et al. | |
| 2010/0082521 A1* | 4/2010 | Meric et al. | 706/53 |
| 2010/0106555 A1 | 4/2010 | Mneimneh et al. | |
| 2010/0114794 A1 | 5/2010 | Lakshminarayan et al. | |
| 2010/0169174 A1 | 7/2010 | Anderson et al. | |

FOREIGN PATENT DOCUMENTS

| | | |
|---|---|---|
| JP | 2005-063353 A | 3/2005 |
| JP | 2005-302040 A | 10/2005 |
| JP | 2006-012143 A | 1/2006 |
| JP | 2006-513474 A | 4/2006 |
| JP | 2007-25843 A | 2/2007 |
| KR | 20080086923 A | 9/2008 |
| WO | 03021514 A1 | 3/2003 |
| WO | 03/050656 A2 | 6/2003 |
| WO | 2004/063942 A1 | 7/2004 |
| WO | 2007/064374 A3 | 6/2007 |
| WO | 2008/092147 | 7/2008 |
| WO | 2008092147 | 7/2008 |

OTHER PUBLICATIONS

Azharul, Hasan K M et al.: "An Efficient Implementation for Molap Basic Data Structure and Its Evaluation", Apr. 9, 2007, Advances in Databases: Concepts, Systems and Applications; [Lecture notes in computer science], Springer Berlin Heidelberg, Berlin, Heidelberg, pp. 288-299, XP019078844.

Pedersen, T B et al.: "Multidimensional Database Technology", Computer, IEEE Service Center, Los Alamitos, CA, US LNKD—DOI: 10.1109/2.970558, vol. 34, No. 12, Dec. 1, 2001, pp. 40-46, XP001092482.

Metadata, http://web.archive.org/web/20070509165728/http://www.bookrags.com/wiki/Metadata, published on May 9, 2007, Wayback Engine.

Shūsaku Wada, 'Construction of the Multiple Autoregression Model Based on the Demand Factors', Journal of the Japan Industrial Management Association, vol. 51, No. 5, Japan, Japan Industrial Management Association, Dec. 15, 2000, vol. 51, pp. 446-451.

Joseph, Joy V., "Understanding Advertising Adstock Transformations", Munich Personal RePEc Archive (MPRA) Paper, Mar. 12, 2008, pp. 1-7, [online], [retrieved on Oct. 15, 2012]. Retrieved from the Internet <URL: http://mpra.ub.uni-muenchen.de/7683/4/Adstock_Model.pdf>.

Guoliang Zhou, et al., "What-if Analysis in MOLAP Environments", 2009 Sixth International Conference on Fuzzy Systems and Knowledge Discovery, Aug. 16, 2009, vol. 2, pp. 405-409.

Andrey Balmin, et al., "Hypothetical Queries in an OLAP Environment", [online], Proceedings of the 26th VLBD Conference, Cairo, Egypt, 2000, pp. 220-231, [retrieved May 14, 2012], Internet <URL, http://www.vldb.org/dblp/db/conf/vldb2000.html>.

* cited by examiner

FIG. 6

MARKETING MODEL DETERMINATION SYSTEM

PRIORITY

This patent application claims priority to U.S. provisional application Ser. No. 61/224,258, filed Jul. 9, 2009 and entitled "Adaptive Analytics Marketing Tool", and also claims priority to U.S. provisional application Ser. No. 61/238,335, filed Aug. 31, 2009 and entitled "Adaptive Analytics with MOLAP System", both of which are incorporated by reference in their entireties.

BACKGROUND

Many companies spend millions of dollars each year on advertising and other marketing activities to improve sales. However, it is very difficult to determine how their marketing activities are impacting their sales. This is primarily due to the many factors that can actually influence sales, which may or may not be related to the marketing activities performed by the companies. For example, economic trends and competitor pricing may impact sales, as well as advertising in relevant marketing channels. As a result, companies have great difficulty focusing their marketing efforts and resources on the activities that are most likely to improve sales.

One approach to determining how a marketing activity impacts sales is to use modeling. Modeling may be used to forecast or predict behavior or outcomes. Models may be generated through a regression analysis or other method of analyzing historic data. For example, companies may use historic sales data to generate a model to predict how sales will be impacted in the future, and these companies may make adjustments to improve sales based on the predictions. However, as indicated above, there are many variables that may be included in the model based on all the factors that may influence sales. Furthermore, some variables may be more accurate than other variables based on insufficient data, inaccuracies and other factors. It is very difficult to select the variables to use in the model that would yield the most accurate forecasting results. Accordingly, many models that may be currently used for forecasting can be inaccurate. Furthermore, reliance on inaccurate models for making adjustments to marketing investments can result in lost profits and wasted resources.

SUMMARY

A system is configured to determine a final model operable to be used to forecast information for a marketing objective. The system includes a variable determination module determining at least one variable operable to be used for the final model and determining a modification to the at least one variable. An assumption determination module determines an assumption operable to be used for the final model. The assumption includes a transformation for the at least one variable describing how the at least one variable impacts the marketing objective or how the at least one variable impacts another variable operable to be used in the final model. The assumption module determines a modification to the assumption. A model generator generates a candidate model using the at least one variable and the assumption, and generates a new candidate model using at least one of the modified assumption, the new variable and the modification to the at least one variable. A model evaluation module, executable by a computer, determines a statistical measure and an indication of relevance for the at least one variable in each of the candidate model and the new candidate model. One of the candidate model and the new candidate model is operable to be selected as the final model based on at least one of the statistical measure and the indication of relevance for the at least one variable in each of the candidate model and the new candidate model.

A method of determining a final model operable to be used to forecast information for a marketing objective includes determining at least one variable operable to be used for the final model. The method also includes determining an assumption operable to be used for the final model, wherein the assumption includes a transformation for the at least one variable describing how the at least one variable impacts the marketing objective or how the at least one variable impacts another variable operable to be used in the final model. The method also includes determining a modification to at least one of the at least one variable and the assumption. The method also includes generating a candidate model using the at least one variable and the assumption. The method also includes generating a new candidate model using the modification, and determining, by a computer, a statistical measure and an indication of relevance for the at least one variable in each of the candidate model and the new candidate model. One of the candidate model and the new candidate model is operable to be selected as the final model based on at least one of the statistical measure and the indication of relevance for the at least one variable in each of the candidate model and the new candidate model. The method may be embodied in a computer program stored on a computer readable storage device and executable by a computer.

BRIEF DESCRIPTION OF DRAWINGS

The embodiments of the invention will be described in detail in the following description with reference to the following figures.

FIG. 6 illustrates an example of a screen shot that may be used to enter and modify variables and assumptions, according to an embodiment;

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

A system is configured to analyze data related to sales and determine models identifying relationships between variables in the data and a marketing objective, such as improving sales, improving brand equity, etc. The variables may have attributes (also referred to as dimensions) organized in a hierarchy. The hierarchy may include sub-attributes or levels for each dimension. For example, one dimension for each marketing channel variable may be geography, and the sub-attributes or levels in the hierarchy may be country, region, city, and zip code. Variables along different dimensions and levels may be evaluated and selected for use in the models. The models may then be used for forecasting, and development of marketing plans. The system may provide a web-based, GUI that allows for easy use.

Some of the features of the system include econometric modeling, fact-based planning and causal forecasting. The system may additionally provide data diagnostics and visualization, mix-model building, and what-if scenario capability. The system may include a web-based, enterprise-ready, scalable computer platform with both hosted ("on-demand") or onsite deployment options. Other smaller-scale computer platforms may be used. Software running on the computer platform provides the functions of the system.

Figure 1:
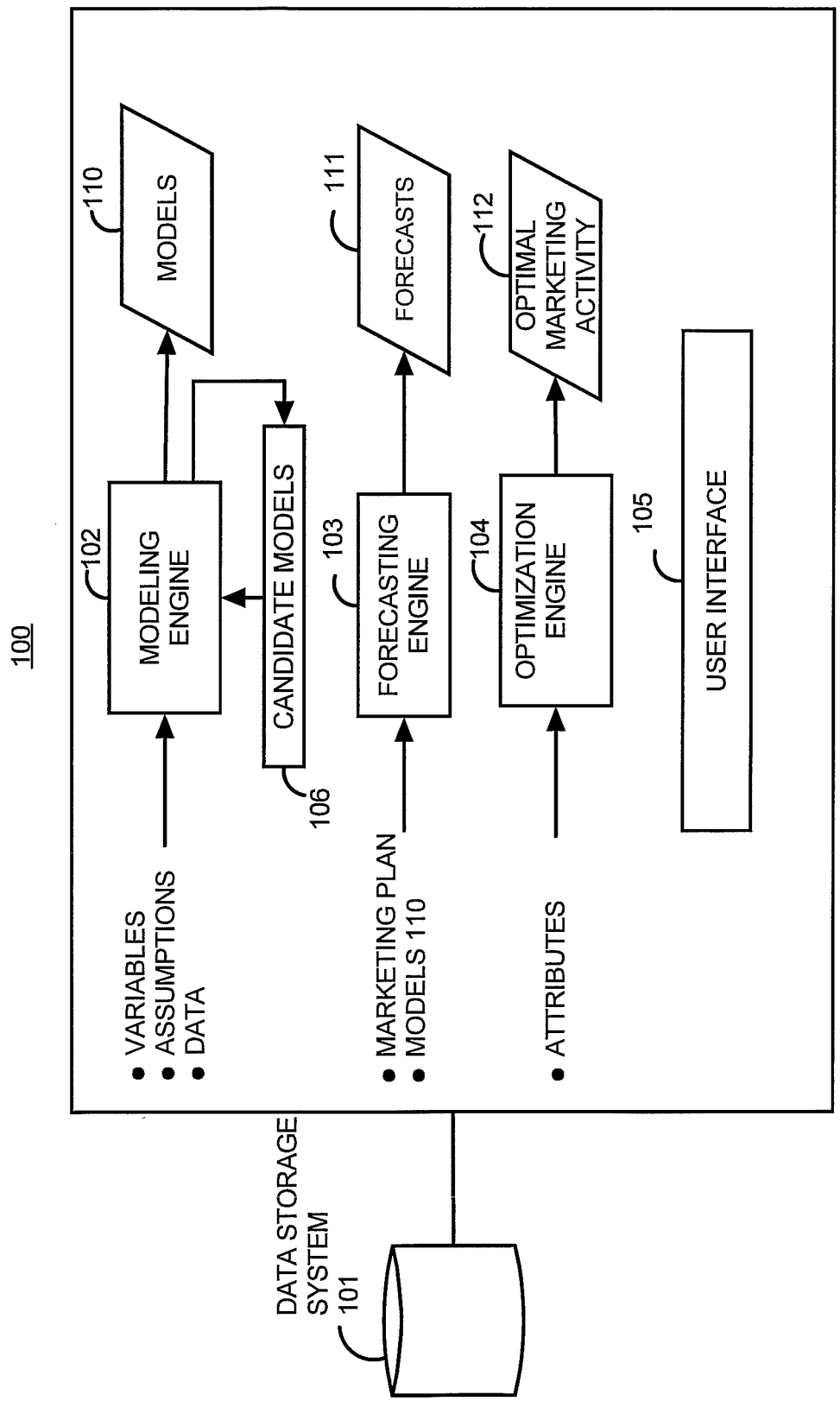
FIG. 1 illustrates a system, according to an embodiment.

FIG. 1 illustrates a system 100, according to an embodiment. The system 100 includes a data storage system 101, a modeling engine 102, a forecasting engine 103, an optimization engine 104 and a user interface 105. The data storage system 101 stores any data related to a marketing objective. One example of a marketing objective is improving sales. The stored data may include historic sales data, variables for data related to marketing activities, economic trends, and other types of data. The variables may include different metrics that impact sales. For example, the variables may include costs (e.g., amount spent) for activities in different marketing channels, such as TV, radio, print, and online. Other variables may include macro-economic factors that impact sales, such as unemployment, gross domestic product, etc. The data storage system 101 may also store data entered by a user through the user interface 105 and may store models and other information generated by the system 100.

As described above, the data related to sales in the data storage system 101 may be characterized by attributes (also referred to as dimensions) organized in a hierarchy. The hierarchy may include sub-attributes or levels for each dimension. For example, one dimension for each marketing channel variable may be geography, and the sub-attributes or levels in the hierarchy may be country, region, city, and zip code.

The modeling engine 102 uses data from the data storage system 101, which may be provided by a user or other data sources, to generate relationships between the variables and the marketing objective, such as sales performance. These relationships form the models 110. In one example, a relationship between a variable and sales may be represented as a curve or function. For example, a curve may be generated whereby each point on the curve indicates a predicted amount of sales generated (incremental or cumulative) for an amount invested or spent for the variable.

The modeling engine 102 uses various transformations and other mechanisms to develop the models. A transformation describes how a variable impacts the marketing objective. The transformation may also describe how the variable impacts another variable. A transformation may be represented by a function that uses one or more input parameters to adjust function variables. Examples of the transformations include ad-stocking, advertising lag, and ad saturation. Ad-stocking is a decay rate mechanism for advertising indicating the decaying effectiveness of an ad over time. Ad lag is the time-shifted impact of advertising. If you advertise in one week, the impact of that advertising is going to show up in sales but not in that week necessarily. Instead, it might be in a period of the next eight weeks, and the ad-lag may indicate that delayed effectiveness of the ad. Ad saturation uses a diminishing-return function which is an exponential function that indicates, as the market is saturated with marketing, that the impact of the ad will likely reduce. For example, for a million dollars spent on a marketing activity, the first 50 thousand invested is more likely to impact sales rather than the last 50 thousand invested. Ad saturation may also be referred to as ad power. The ad power may indicate the amount of diminishing returns per amount spent. Another example of a transformation may include a synergy effect. The synergy effect is when actions for at least two types of marketing activities positively impact sales for the same product. The synergy effect is a combined or complementary effect of simultaneous marketing activities. For example, if amount spent for two different marketing activities was increased by 2% for each activity, the synergy effect causes the sales of the product to improve by 10% rather than 4%.

The modeling engine 102 tries different permutations of the transformations to determine, with all the variables mapped in as inputs, the best fitting mathematical relationships. A linear regression and/or a mixed modeling approach may be utilized. The best fitting relationships define the model and indicate the relationships between the variables and the marketing objective.

The modeling engine 102 may use variables, assumptions and data, such as historic sales data to generate the models 110. Through the user interface 105, different variables may be selected. Also, dimensions and levels may be selected for the variables. Assumptions may also be received. The assumptions may include transformations and parameters for the transformations. An assumption may include an estimation for a variable or set of variables. The estimation may be an estimation for one or more transformations. For example, the estimation may be an amount of lag, power or ad stock for a variable. The estimation may be an assumption about interaction transformations, such as amount of synergy or cannibalism between two variables.

The assumption may include one or more rules, also referred to as constraints. The rules may be used to determine the relevance of a variable to sales. The rules may be used to determine whether a variable drops out or is retained during the model testing. The rules may be based on business objectives, such as what is my average return per gross rating point for television marketing. A rule may be a condition. One example of a condition is that a higher price improves sales. The modeling engine 102 tests this condition, and then, if the condition is not met, may drop price as a variable or indicate that the condition is not met. In another example, the assumptions may include two mutually exclusive assumptions. For example, one assumption includes the rule that a higher price improves sales. Another assumption includes a rule that a lower price improves sales. One assumption must drop out. Also, both may drop out if both are found not true based on the statistical analysis performed by the modeling engine 102.

The assumption may also include a filter criteria which describes the marketing objective. For example, equity is a filter criteria, and the model engine 102 is run for the assumptions to determine whether they relate to brand equity. Another example of a filter criteria is sales to see how the assumptions related to sales.

The modeling engine 102 allows a user to vary the variables and assumptions used to generate a model. The variations may be entered through the user interface 105. For each set of variations, the modeling engine 102 generates a candidate model. Multiple candidate models 106 may be generated by the modeling engine 102 for the different variations. The candidate models 106 are evaluated, for example, through statistical measures and other factors to determine their accuracy and viability for forecasting. One or more of the candidate models 106 may be selected as final models, shown as the models 110, to be used for analysis, planning and forecasting.

The forecasting engine 103 uses the models 110 to perform "what-if" analysis to estimate the impact of the variables on sales. For example, a current marketing plan may be stored in the data storage system 101 and includes amount spent for different marketing channels. The user, through the user interface 105, may vary values for variables in the model, such as amount spent for different marketing channels, and the forecasting engine 103 runs these variations through the models 110 and outputs, for example, the estimated sales generated given the amount spent for marketing in each of the channels. By running the forecasting engine 103 for different variations, the user may determine the best amount to invest in each marketing channel to maximize sales.

The optimization engine 104 may be used for the development of the marketing plan. The optimization engine 104 can evaluate the outputs of the forecasting engine 103 to determine how best to optimize variables, such as amount spent for different marketing channels, to maximize sales and create a new marketing plan. The optimization engine 104 may use the models 110 to determine a maximum and minimum amount that should be spent for various marketing channels to maximize sales.

Figure 2:
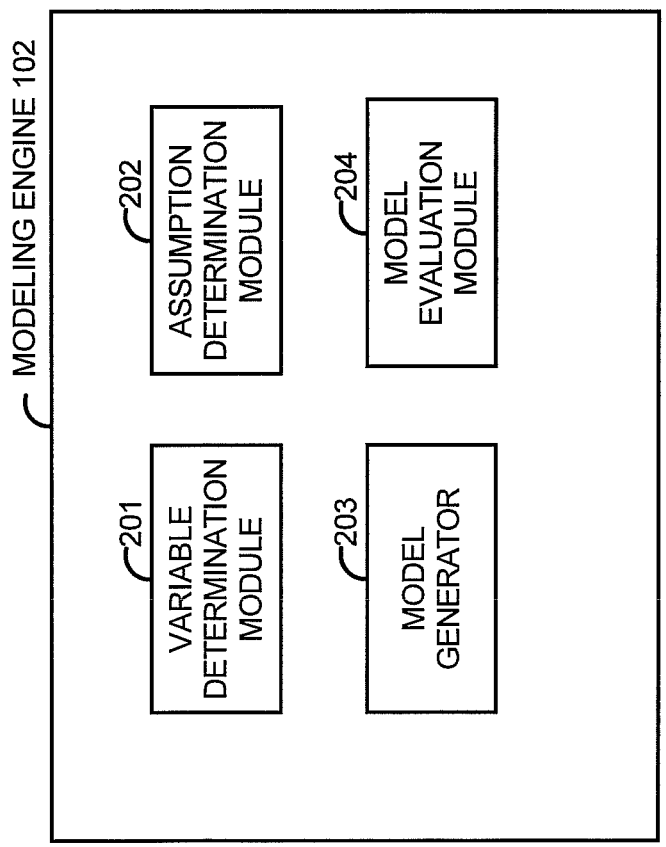
FIG. 2 shows a block diagram of a modeling engine 102, according to an embodiment.

FIG. 2 shows a more detailed block diagram of the modeling engine 102. The modeling engine 102 includes a variable determination module 201, an assumption determination module 202, a model generator 203, and a model evaluation module 204. The modules and other components of the modeling engine 102 may include software, hardware or a combination of software and hardware.

The variable determination module 201 determines the variables to be used for generating a model, and the assumption determination module 202 determines the assumptions to be used for generating the model. In one embodiment, the variables and assumptions may be input by a user through the user interface 105 and received by the modules 201 and 202. Also, modifications to the variables and assumptions may also be input by a user through the user interface 105 and received by the modules 201 and 202 for generating different candidate models.

The model generator 203 generates models using the variables and assumptions determined by the modules 201 and 202. The modeling engine 102 runs the assumptions and variables through multiple, separate regression analyses to determine the relationships between the variables and sales. These relationships form a candidate model which is generated by the modeling engine 102.

Determining the relationships between the variables and sales and determining the response curves describing the relationships is further described in co-pending U.S. patent application Ser. No. 11/483,401, entitled "Modeling Marketing Data" by Andris Umblijs et al., filed Jul. 7, 2006, which is incorporated by reference in its entirety.

For example, given a selected set of variables, a statistical regression (e.g., linear regression) approach is used to determine model coefficients. These are coefficients for the variables of the model that best map the data for the variables (e.g., cost data for marketing channels) to the corresponding historic performance data. Estimation of the coefficients of the variables for a candidate model is performed using regression techniques to produce multi-variable functions (e.g., curves) that best fit computed output of the given input data to its corresponding output. In some embodiments the regression techniques perform non-linear regression for at least some of the variables of the candidate model to account for any non-linear behavior associated with such variables (e.g., market variables that display diminishing returns behavior).

The model evaluation module 204 determines a statistical measure and an indication of relevance for the variables in each candidate model. Based on the statistical measure and indication of relevance for each variable, the candidate model may be selected as the final model or may not be selected. The statistical measure indicates the statistical significance of a variable to the marketing objective. The indication of relevance indicates a level of impact the variable has on the marketing objective.

For example, the model evaluation module 204 evaluates each variable using a function to determine a statistical measure indicating whether the variable is statistically significant. In one example, contribution of the variable to the performance of the model should exceed a pre-defined threshold. The contribution of the variable, which is an example of a statistical measure, is determined using transformed historical data and the produced coefficients to determine an estimate of relative impact on the dependent variable. Subsequently, in certain cases, this relative impact may be run through a heuristic weighting process to determine final contributions for comparison. This model characteristic reflects the fact that the model should not have variables whose contributions to the model's performance is negligible. In some embodiments, the pre-defined statistical significance threshold may be 10%. In some embodiments the threshold may be 5%. Lower or higher statistical significance thresholds may be used according to the level of complexity desired for the model.

Also, the model evaluation module 204 determines whether assumption rules for the variable are satisfied. For example, a rule may be a condition. One example of a condition is that a higher price improves sales. The modeling engine 102 tests this condition, and then, if the condition is not met, may drop price as a variable or indicate that the condition is not met. In another example, the assumptions may include two mutually exclusive assumptions. For example, one assumption includes the rule that a higher price improves sales. Another assumption includes a rule that a lower price improves sales. One assumption must drop out. Also, both may drop out if both are found not true based on the statistical analysis performed by the modeling engine 102.

The model evaluation module 204 determines an indication of relevance for each variable. The indication of relevance indicates a level of impact the variable has on the marketing objective. In one example, the model evaluation module 204 indicates whether a variable is retained or is dropped. An indication that the variable is retained means the variable is relevant to the marketing objective. The indication of relevance may be based on the statistical measure, whether the variable satisfies assumption rules, and/or other factors.

Figure 3:
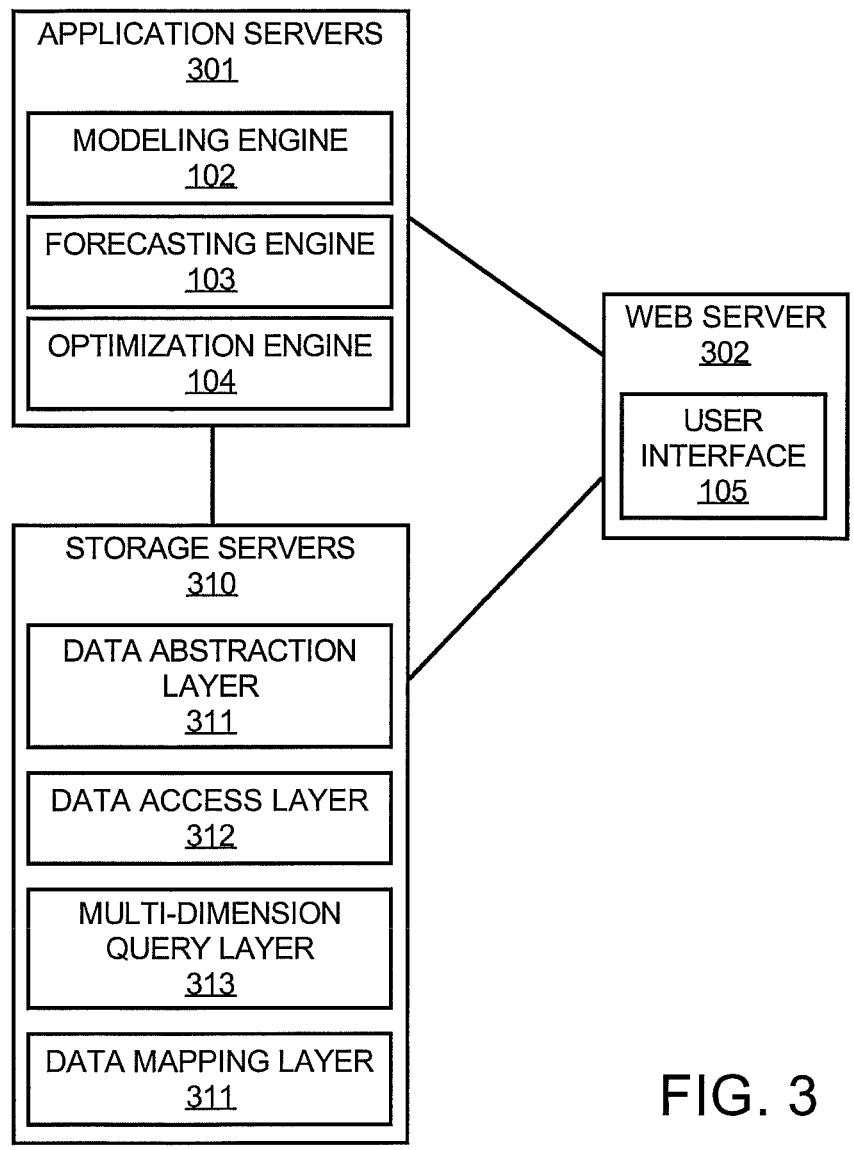
FIG. 3 shows a technical implementation of the system shown in FIG. 1, according to an embodiment.

FIG. 3 shows a technical implementation of the system 100, according to an embodiment. The system 100 includes application servers 301 hosting the modeling engine 102, forecasting engine 103, and optimization engine 104. The data storage system 101 may be hosted by servers and storage systems, such as a storage area network or other conventional system, shown as 310. Architectural layers for the data storage system 101 are shown in 310. In one embodiment, the data storage system 101 utilizes a multidimensional data model as described in further detail below. The data storage system 101 includes a data abstraction layer 311 which is a data structure for data stored in the data storage system 101. The data abstraction layer 311 is shown in more detail in FIG. 3 and includes a meta data layer and data layer.

The data storage system 101 also includes a data access layer 312 that supports access to multidimensional data stored in the data storage system 101. In one example, the data access layer 312 may include XML for analysis (XMLA), which is an industry standard for accessing systems.

A multidimensional query layer 313 supports multidimensional analytical queries. The multidimensional query layer 313 is configured to aggregate across different levels in the hierarchies in the dimensions to respond to multidimensional analytical queries. Meta data for each stored measure indicates aggregation rules for performing multidimensional queries for forecasting and/or data analysis.

Figure 4:
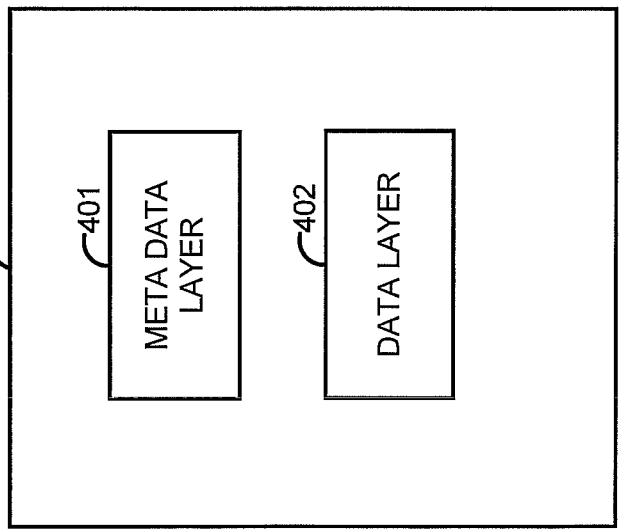
FIG. 4 illustrates a data structure of a data model for a data abstraction layer, according to an embodiment.

A data mapping layer 314 stores data in the data storage system 101 according to the data model shown in FIG. 4. For example, the data mapping layer 314 may associate the proper meta data with each variable across multiple dimensions.

The system 100 may include web servers 302 which host the user interface 105. The user interface 105 may provide a rich user interface allowing users to enter assumptions to test using the modeling engine 102 and allow the user to run reports and generate graphical analysis for forecasting and planning. The technical architecture may be highly scalable to allow processing of large amounts of data for a large number of users.

FIG. 4 illustrates a data structure 400 of a data model for the data abstraction layer 311 shown in FIG. 3. As shown in FIG. 4, the data structure 400 includes a meta data layer 401 and a data layer 402. The meta data layer 401 stores relationship data generated through the process of determining the models 110 using the modeling engine 102 shown in FIG. 1. The relationship data may include a mathematical representation of the relationship between variables in the model and the output of the model, which may be estimated sales. The relationship data may include the coefficients determined by the model generator 203 shown in FIG. 2. The meta data layer 401 also includes information describing the assumptions and variables used to create the model, such as transformations, rules, variable dimensions and layers, and other associated information. The meta data layer 401 also supports multidimensional queries by storing aggregation rules for the data. The aggregation rules describe how to aggregate up from a lower level in a hierarchal dimension to a higher level and what transformations to apply for each level. For example, the meta data layer 401 may indicate that if state-level information on sales is requested, then aggregate city level to state for the TV marketing channel variable using a lag transform with predetermined parameters. These aggregation rules may be applied for the "what-if" scenario processing performed by the forecasting engine 103. The data layer 402 identifies the actual data stored in the data storage system 101 that is relevant to the model, such as costs for each marketing activity across different dimensions and at different levels of the hierarchy. In one embodiment, this may include data that is at the lowest level of each dimension, and then the aggregation rules may determine how to aggregate up to higher levels in the dimension.

One technical effect is that through use of the data structure 400 for each model, the query processing and the "what-if" scenario processing performed by the forecasting engine 103 is made much faster and multi-dimensional querying is also made much faster.

In other embodiments, instead of using the data structure 400, conventional Online Analytical Processing (OLAP) or Relational Online Analytical Processing (ROLAP) systems may be used.

Figure 5:
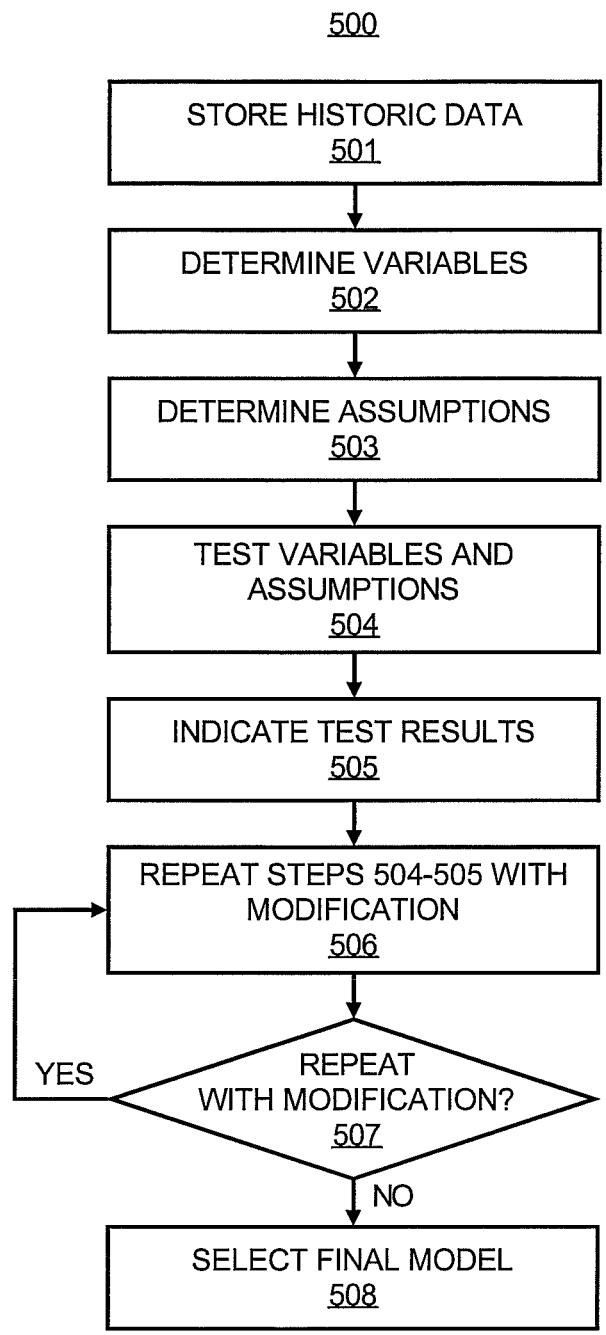
FIG. 5 illustrates a flow chart of a method for determining a final model, according to an embodiment.

FIG. 5 illustrates a flow chart of a method 500 for determining a final model, according to an embodiment. The final model may be used to forecast sales and perform what-if analysis. The method 500 is described with respect to the system 100 shown and described in FIGS. 1-3 by way of example and not limitation.

At step 501, historic data is stored in the data storage system 101. This step may be performed continually or periodically as data is received from sources. The data may include actual sales and cost data as well as other data that can be measured or otherwise determined.

At step 502, a variable or set of variables are determined. For example, variables are selected through the user interface 105. The selection of the variables may include selecting a dimension and or level of one or more of the variables. For example, a product and product type may be selected based on the stored sales data. Also, geography is selected as a dimension and district is selected as a level in a hierarchy for the geography dimension. These variables with their dimension and level are selected for testing in a model.

At step 503, one or more assumptions are determined. The assumptions may be received through the user interface 105. An assumption may include an estimation for the variable or set of variables. The estimation may be an estimation for one or more transformations. For example, the estimation may be an amount of lag, power or ad stock for a variable. The estimation may be an assumption about interaction transformations, such as amount of synergy or cannibalism between two variables.

The assumption may include one or more rules, also referred to as constraints. The rules may be used to determine the relevance of a variable to sales. The rules may be used to determine whether a variable drops out or is retained during the model testing. The rules may be based on business objectives, such as what is my average return per gross rating point for television marketing. A rule may be a condition. One example of a condition is that a higher price improves sales. The modeling engine 102 tests this condition, and then may drop price as a variable or indicate that the condition is not met. In another example, the assumptions may include two mutually exclusive assumptions. For example, one assumption includes the rule that a higher price improves sales. Another assumption includes a rule that a lower price improves sales. One assumption must drop out. Also, both may drop out if both are found not true based on the statistical analysis performed by the modeling engine 102.

The assumption may also include a filter criteria which describes the marketing objective. For example, equity is a filter criteria, and the model engine 102 is run for the assumptions to determine whether they relate to brand equity. Another example of a filter criteria is sales to see how the assumptions related to sales.

At step 504, the received variables and assumptions are tested by the modeling engine 102. The modeling engine 102 runs the assumptions through multiple, separate regression analyses to determine the relationships between the variables and sales. These relationships form a candidate model which is generated by the modeling engine 102. The modeling engine 102, through the regression analysis, also determines statistical measures describing the accuracy of the assumptions in the candidate model.

The modeling engine 102 may test the model for different data sets of historic sales data. A data set may be varied by time frame, dimension levels, etc. The testing for each of the data sets generates multiple candidate models that are evaluated. At step 505, the modeling engine 102 indicates the testing results. For example, the modeling engine 102 determines a statistical measure for each of the variables in the model and determines an indication of relevance for each of the variables. The indication of relevance may indicate whether to retain each variable, i.e., whether each variable in each assumption is considered to stick. The testing results are indicated for the candidate model.

At step 506, the steps 504 and 505 are repeated with a modification to one or more assumptions or variables. The modification may be to a variable, such as a change to a transformation parameter or adding or deleting transformations, or a change to a dimension or level or adding a new variable. The modification may be to an assumption such as a modification to a filtering criteria, an aggregation rule or an assumption rule. The modeling engine 102 determines testing results for the new candidate model.

At step 507, a determination is made as to whether to generate more candidate models by modifying the assumptions. A user may determine based on testing results whether to continue generating more candidate models. The decision may be based on the statistical evaluation (i.e., testing results from step 505) indicating how relevant each variable is to impacting sales or some other objective. For example, if the user determines that 40% of the variables were dropped, the user may continue to generate additional candidate models until at least 80% of the variables are retained.

At step 508, a candidate model is selected as a final model to be used for forecasting. Forecasting may include simulating various scenarios to estimate how it will impact sales. For example, the final model may be used to determine whether increasing marketing spend for a particular channel will improve sales. The forecasting engine 103 performs the forecasting using the final model.

The candidate models may be tested to determine the best performing candidate model, and then the best performing candidate model may be selected as the final model. For example, the system 100 generates a curve of actual sales for a predetermined historic time period, given a set of inputs. Using the same set of inputs and the candidate model, a curve is generated for an estimation of sales. The curves are compared. The candidate model having the smallest error between curves may be selected as the final model.

At step 509, the assumptions for the final model are stored in the meta data layer of the data structure 400. For example, the data structure 400 shown in FIG. 4 includes a meta data layer 401 and a data layer 402. The meta data layer 401 stores the assumptions, variables, dimensions and levels, aggregation rules, and relationship data for the final model. The data layer 402 identifies the actual data stored in the data storage system 101 that is relevant to the final model, such as costs for each marketing activity across different dimensions and at different levels of the hierarchy. In one embodiment, this may include data that is at the lowest level of each dimension, and then the aggregation rules may determine how to aggregate up to higher levels in the dimension.

Figure 6:
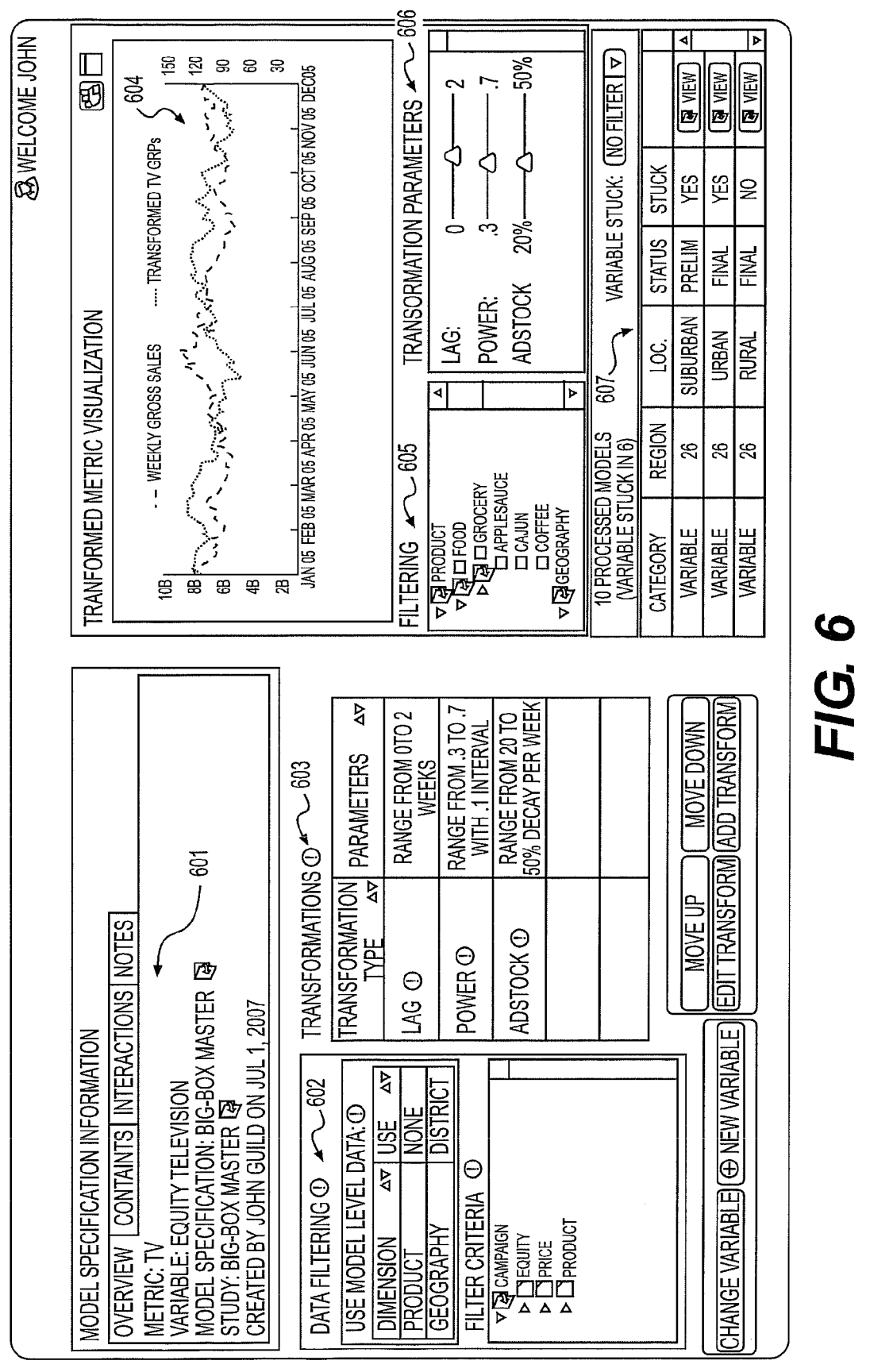

FIG. 6 illustrates a screen shot that may be generated by the user interface 105 of FIG. 1. The screen shot shows how variables and assumptions may be provided to the system 100 of FIG. 1, and shows examples of how the variables and assumptions may be modified for generating multiple candidate models, such as the candidate models 106 shown in FIG. 1. FIG. 6 also shows an example of an indication of relevance generated for each variable, such as whether the variable was considered to "stick" or not based on the evaluation of the variable in the candidate model. 601 shows overview information that may be entered by the user to describe the model being generated. 602 shows examples of selecting different dimensions and levels that me be selected for different variables. Under filtering in 602, the variables are selected that are associated with brand equity. However, through the "change variable" and the "new variable" button, variables may be modified and new variables may be added. 606 shows the selected variables and the selected dimensions and levels.

603 shows examples of different transformations and transformation parameter values that were selected for the transformations. Through the buttons below the transformations, the transformations may be modified. Also, 606 shows modifying the transformation parameters for the transformations using sliders.

604 shows two curves generated by the model being tested. One curve is the estimated sales and other curve is associated with transformations. 607 shows an indication of relevance for a variable in a particular region (i.e., level of a geography dimension). Note that 607 shows whether the variable stuck which indicates whether the variable was kept in the model. The model may include multiple variables and not all may stick.

Figure 7:
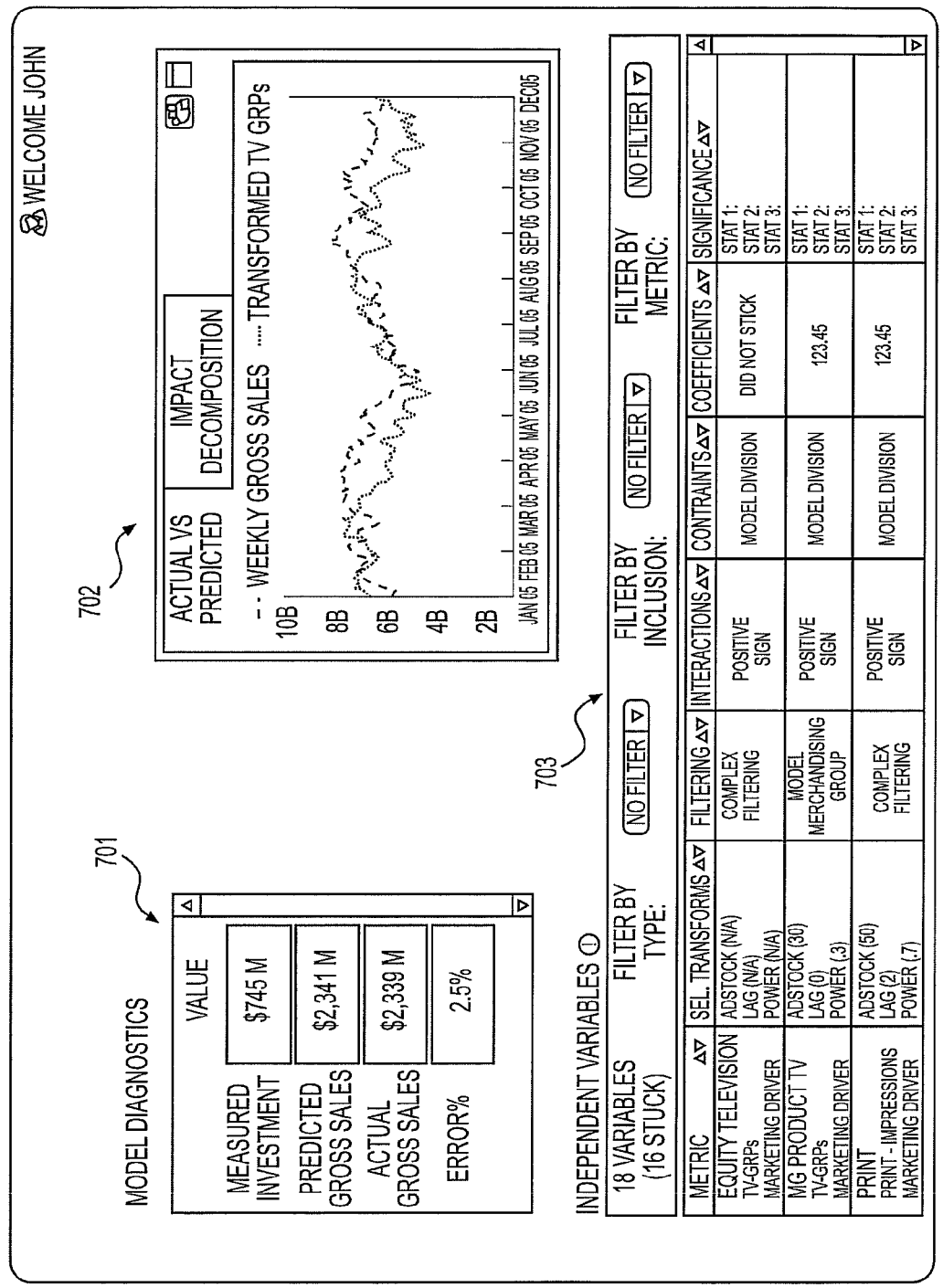
FIG. 7 illustrates an example of a screenshot that may be used to display testing results, according to an embodiment.

FIG. 7 shows a screenshot of testing results for testing candidate models. 701 shows that the testing of the candidate model indicates a 2.5% error between the predicted results and the actual results. 702 shows the error through graphs. 703 shows examples of different variables that were tested in the candidate model, which are shown as metrics. Also, shown are the transformations, and the filters selected. Also, shown are assumption rules or constraints and the modeling coefficients generated for each variable. Also shown is whether the variable was considered to "stick", i.e., the indication of relevance. Out of 18 variables, 16 were considered relevant and are shown as stuck.

Figure 8:
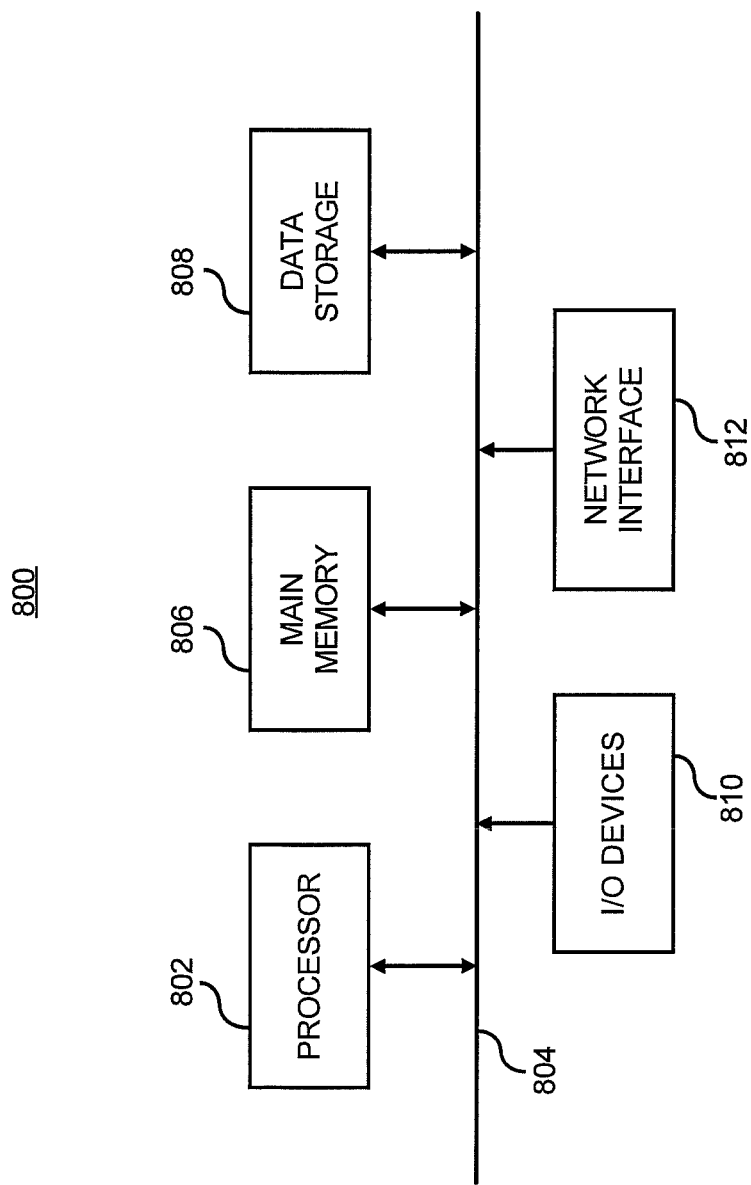
FIG. 8 illustrates a computer system that may be used as a platform for one or more of the components of the system shown in FIG. 1, according to an embodiment.

FIG. 8 shows a computer system 800 that may be used with the embodiments described herein. The computer system 800 represents a generic platform that includes components that may be in a server or other computer system. The computer system 800 may be used as a platform for executing one or more of the methods, functions and other steps described herein. These steps may be embodied as software stored on one or more computer readable storage devices. Furthermore, the components of the system 100 shown in FIG. 1 may be software, hardware or a combination of hardware and software.

The computer system 800 includes a processor 802 that may implement or execute software instructions performing some or all of the methods, functions, and other steps described herein. Commands and data from the processor 802 are communicated over a communication bus 804. The computer system 800 also includes a main memory 806, such as a random access memory (RAM), where the software and data for processor 802 may reside during runtime, and a secondary data storage 808, which may be non-volatile and stores software and data. The memory and data storage are examples of computer readable mediums.

The computer system 800 may include one or more I/O devices 810, such as a keyboard, a mouse, a display, etc. The computer system 800 may include a network interface 812 for connecting to a network. It will be apparent to one of ordinary skill in the art that other known electronic components may be added or substituted in the computer system 800.

One or more of the steps and one or more of the components of the systems described herein may be implemented as computer code stored on a computer readable medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments. For example, the systems and method described herein are described generally with respect to modeling variables for sales data. However, the modeling is not limited to sales-related information and is applicable to modeling for other types of data and for other marketing objectives.

What is claimed is:

1. A system to determine a final model to forecast information, the system comprising:
    a multidimensional data storage system that includes a data storage that stores information for models, the multidimensional storage system comprising:
        a metadata layer that stores, for each model:
            a relationship between variables and an objective;
            a dimension for each of the variables;
            a plurality of levels for the dimensions of the variables, the plurality of levels defining a hierarchy of levels for each of the dimensions;
            assumption rules for the variables describing how the variables impact the objective or how the variables impact other variables;
            aggregation rules for the variables that describe how to aggregate up from a lowest level to higher levels of the dimension, and a transformation to apply for each level;
        a data layer that stores data for the variables in each model, the data layer comprising data at the lowest level of each dimension; and
        a multidimensional query layer that receives a request for a multidimensional query and aggregates across different levels of the hierarchy of levels for the variables using the aggregation rules stored in the meta data layer;
    a model generator executed by a processor that generates a candidate model using the variables and the assumption rules;
    a model evaluation module executed by the processor to:
        determine, for each of the variables in the candidate model, a dimension and level for the variable, and executes by the multidimensional query layer a query to retrieve data for the dimension and the level for each variable by aggregating data for a lowest level of the dimension to the determined level according to the aggregation rules;
        determine a statistical significance measure to the objective based on the retrieved data for the dimension and the level for each of the variables; and
        determine an indication of relevance for each of the variables in the candidate model indicating a level of impact each of the variables has on the objective, wherein each of the assumption rules specifies a condition, and the model evaluation module is to determine the indication of relevance for each of the variables based on whether the condition in at least one of the assumption rules is satisfied; and
        determine which of the variables in the candidate model to retain based on a comparison of the statistical significance measures to a predetermined relevance threshold;
    wherein the model generator:
        determines modifications to the assumption rules;
        determines whether the assumption rules include mutually exclusive assumption rules;
        in response to an identification of the mutually exclusive assumption rules, deletes one of the mutually exclusive assumption rules based on the statistical significance measures of the variables; and
        generates a new candidate model based on at least one of the modifications to the assumption rules, a modification to the variables, the statistical significance measures, and an indication of relevance for each of the variables in the new candidate model,
    wherein one of the candidate model and the new candidate model is selected as the final model based on a comparison of at least one of the statistical measures and the indication of relevance for the variables in each of the candidate model and the new candidate model.

2. The system of claim 1, further comprising:
    a forecasting engine that applies to the final model proposed values for the variables, and historic data to generate predictions for the objective.

3. The system of claim 1, wherein each of the transformations includes an input parameter to describe an amount of the impact of each transformation.

4. The system of claim 1, further comprising:
    a user interface to receive the variables, the assumption rules, the modifications to the variables and the modifications to the assumption rules.

5. The system of claim 1, wherein the objective is increasing sales of a product or service.

6. A method of determining a final model to be used to forecast information, the method comprising:
    storing information for models in a multidimensional data storage system that includes a data storage, the multidimensional storage system comprising:
        a metadata layer storing, for each model:
            a relationship between variables and an objective;
            a dimension for each of the variables;
            a plurality of levels for the dimensions of the variables, the plurality of levels defining a hierarchy of levels for each of the dimensions;
            assumption rules for at least one of the variables describing how the variables impact the objective or how the variables impact other variables;
            aggregation rules for the variables that describe how to aggregate up from a lowest level to higher levels of the dimension, and a transformation to apply for each level;
        a data layer storing data for the variables in each model, the data layer comprising data at the lowest level of each dimension, and
        a multidimensional query layer receiving a request for a multidimensional query and aggregating across different levels of the hierarchy of levels for the variables using the aggregation rules stored in the meta data layer;
    generating, by a processor, a candidate model using the variables and the assumption rules;
    determining, for each of the variables in the candidate model, a dimension and level for the variable;

executing by the multidimensional query layer a query to retrieve data for the dimension and the level for each variable by aggregating data for a lowest level of the dimension to the determined level according to the aggregation rules;

determining, by the processor, a statistical significance measure for each of the variables in the candidate model to the objective;

determining an indication of relevance for each of the variables in the candidate model indicating a level of impact each of the variables has on the objective, wherein each of the assumption rules specifies a condition, and determining the indication of relevance for each of the variables is based on whether the condition is satisfied in at least one of the assumption rules;

determining which of the variables in the candidate model to retain based on a comparison of the statistical significance measures to a predetermined relevance threshold;

determining modifications to the assumption rules;

determining whether the assumption rules include mutually exclusive assumption rules;

in response to an identification of the mutually exclusive assumption rules, deleting one of the mutually exclusive assumption rules based on the statistical significance measures of the variables;

generating a new candidate model based on at least of the modification to the assumption rules, the modifications to the variables, the statistical significance measures, and an indication of relevance for each of the variables in the new candidate model; and selecting one of the candidate model and the new candidate model as the final model based on a comparison of at least one of the statistical significance measures and the indication of relevance for the variables in each of the candidate model and the new candidate model.

7. The method of claim 6, further comprising:
generating, by the processor, predictions for the objective using the final model, proposed values for the at least one variable, and historic data.

8. The method of claim 7, wherein determining the statistical significance measure and the indication of relevance for the variables comprises:
determining the statistical measure and the indication of relevance for each of the variables using the dimension and level of the plurality of levels for the variables.

9. The method of claim 6, wherein the transformation for the at least one variable includes an input parameter describing an amount of the impact for the transformation.

10. A non-transitory computer readable storage device storing a computer program comprising instructions executed by a processor to:
store information for models in a multidimensional data storage system that includes a data storage, the multidimensional storage system comprising:
a metadata layer that stores, for each model:
a relationship between variables and an objective;
a dimension for each of the variables;
a plurality of levels for the dimensions of the variables, the plurality of levels defining a hierarchy of levels for each of the dimensions;
assumption rules for at least one of the variables describing how the variables impact the objective or how the variables impact other variables; and
aggregation rules for the variables that describe how to aggregate up from a lowest level to higher levels of the dimension, and a transformation to apply for each level;
a data layer that stores data for the variables in each model, the data layer comprising data at the lowest level of each dimension, and
a multidimensional query layer that receives a request for a multidimensional query and aggregate across different levels of the hierarchy of levels for the variables using the aggregation rules stored in the meta data layer;
generate a candidate model using the variables and the assumption rules;
determine, for each of the variables in the candidate model, a dimension and level for the variable;
execute by the multidimensional query layer a query to retrieve data for the dimension and the level for each variable by aggregating data for a lowest level of the dimension to the determined level according to the aggregation rules;
determine, for each of the variables in the candidate model, a statistical significance measure to the objective based on the retrieved data for the dimension and the level for each of the variables;
determine an indication of relevance for each of the variables in the candidate model indicating a level of impact each of the variables has on the objective, wherein each of the assumption rules specifies a condition, and to determine the indication of relevance for each of the variables, the instructions are to cause the processor to determine whether the condition in at least one of the assumption rules is satisfied;
determine which of the variables in the candidate model to retain based on a comparison of the statistical significance measures to a predetermined relevance threshold;
determine modifications to the assumption rules;
determine whether the assumption rules include mutually exclusive assumption rules;
in response to an identification of the mutually exclusive assumption rules, delete one of the mutually exclusive assumption rules based on the statistical significance measures of the variables;
generate a new candidate model based on at least one of the modifications to the assumption rules, the modifications to the variables, the statistical significance measures, and an indication of relevance for each of the variables in the new candidate model, and
select one of the candidate model and the new candidate model as a final model based on a comparison of at least one of the statistical significance measures and the indication of relevance for the variables in each of the candidate model and the new candidate model.

11. The non-transitory computer readable storage device of claim 10, wherein the instructions are further to:
generate predictions for the objective using the final model, proposed values for the at least one variable, and historic data.

12. The non-transitory computer readable storage device of claim 11, wherein to determine a statistical significance measure and an indication of relevance for each variable, the instructions are to use:
the dimension and a level of the plurality of levels for the at least one variable.

* * * * *